United States Patent
Laine et al.

(10) Patent No.: US 12,304,447 B2
(45) Date of Patent: May 20, 2025

(54) WHEEL SLIP BASED VEHICLE MOTION MANAGEMENT FOR HEAVY DUTY VEHICLES

(71) Applicant: VOLVO TRUCK CORPORATION, Gothenburg (SE)

(72) Inventors: Leo Laine, Härryda (SE); Adithya Arikere, Gothenburg (SE); Sidhant Ray, Gothenburg (SE); Mattias Åsbogård, Mölnlycke (SE); Leon Henderson, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 180 days.

(21) Appl. No.: 17/450,518

(22) Filed: Oct. 11, 2021

(65) Prior Publication Data
US 2022/0126801 A1 Apr. 28, 2022

(30) Foreign Application Priority Data
Oct. 22, 2020 (EP) .................................. 20203236

(51) Int. Cl.
| | |
|---|---|
| *B60T 8/172* | (2006.01) |
| *B60T 8/17* | (2006.01) |
| *B60T 8/171* | (2006.01) |
| *B60T 8/175* | (2006.01) |
| *B60T 8/1761* | (2006.01) |
| *B60W 40/06* | (2012.01) |
| *B60W 40/101* | (2012.01) |

(52) U.S. Cl.
CPC ............ *B60T 8/172* (2013.01); *B60T 8/1708* (2013.01); *B60T 8/171* (2013.01); *B60T 8/175* (2013.01);
(Continued)

(58) Field of Classification Search
CPC ........ B60T 8/172; B60T 8/1708; B60T 8/171; B60T 8/175; B60T 8/1761;
(Continued)

(56) References Cited

U.S. PATENT DOCUMENTS

| | | | |
|---|---|---|---|
| 2015/0175009 A1* | 6/2015 | Beever | B60L 15/36 701/22 |
| 2016/0327451 A1* | 11/2016 | Bauer | G01M 13/025 |

(Continued)

FOREIGN PATENT DOCUMENTS

| | | |
|---|---|---|
| CN | 108394313 A | 8/2018 |
| WO | 2014184344 A1 | 11/2014 |

(Continued)

OTHER PUBLICATIONS

Pacejka, Hans, "Tire and Vehicle Dynamics", 2012, Elsevier Ltd.
(Continued)

*Primary Examiner* — Andrew J Cromer
(74) *Attorney, Agent, or Firm* — Venable LLP; Jeffri A. Kaminski

(57) ABSTRACT

A control unit (130, 140, 300) for controlling a heavy duty vehicle (100),
  wherein the control unit is arranged to obtain an acceleration profile ($a_{req}$) and a curvature profile ($c_{req}$) indicative of a desired maneuver by the vehicle (100),
  the control unit (130, 140, 300) comprising a force generation module (310) configured to determine a set of global vehicle forces and moments required to execute the desired maneuver,
  the control unit (130, 140, 300) further comprising a motion support device, MSD, coordination module (320) arranged to coordinate one or more MSDs to collectively provide the global vehicle forces and moments by generating one or more respective wheel forces, and
an inverse tyre model (330) configured to map the one or more wheel forces into equivalent wheel slips ($\lambda$),
  wherein the control unit (130, 140, 300) is arranged to request the wheel slips ($\lambda$) from the MSDs.

15 Claims, 5 Drawing Sheets

(52) U.S. Cl.
CPC ........ *B60T 8/1761* (2013.01); *B60T 8/17616* (2013.01); *B60W 40/06* (2013.01); *B60W 40/101* (2013.01); *B60T 2210/12* (2013.01); *B60T 2220/04* (2013.01); *B60T 2240/00* (2013.01); *B60T 2250/04* (2013.01); *B60T 2270/86* (2013.01); *B60W 2520/105* (2013.01); *B60W 2520/26* (2013.01)

(58) Field of Classification Search
CPC ............. B60T 8/17616; B60T 2210/12; B60T 2220/04; B60T 2240/00; B60T 2250/04; B60T 2270/86
See application file for complete search history.

(56) References Cited

U.S. PATENT DOCUMENTS

| | | |
|---|---|---|
| 2017/0168500 A1 | 6/2017 | Bradley et al. |
| 2017/0174192 A1 | 6/2017 | Ying |
| 2019/0176784 A1* | 6/2019 | Laine ..................... B60T 8/172 |
| 2019/0248370 A1 | 8/2019 | Cunningham et al. |

FOREIGN PATENT DOCUMENTS

| | | |
|---|---|---|
| WO | 2016124629 A1 | 8/2016 |
| WO | 2017215751 A1 | 12/2017 |
| WO | 2019042453 A1 | 3/2019 |
| WO | 2019072379 A1 | 4/2019 |

OTHER PUBLICATIONS

European Search Report dated Mar. 9, 2023 in corresponding European Patent Application No. 20203236.3, 5 pages.
European Communication under Rule 71(3) EPC dated Jan. 23, 2024 in corresponding European Patent Application No. 20203236.3, 8 pages.
European Search Report dated Mar. 22, 2021 in corresponding European Patent Application No. 20203236.3, 9 pages.

* cited by examiner

WHEEL SLIP BASED VEHICLE MOTION MANAGEMENT FOR HEAVY DUTY VEHICLES

TECHNICAL FIELD

The present disclosure relates to vehicle motion management for heavy duty vehicles, i.e., coordinated control of motion support devices such as service brakes and propulsion devices.

The invention can be applied in heavy-duty vehicles such as trucks, buses and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy-duty vehicle may comprise a wide range of different physical devices, such as combustion engines, electric machines, friction brakes, regenerative brakes, shock absorbers, air bellows, and power steering pumps. These physical devices are commonly known as Motion Support Devices (MSDs). The MSDs may be individually controllable, for instance such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion management (VMM) functionality executed, e.g., on a central vehicle unit computer (VUC) relies on coordinating combinations of the MSDs to operate the vehicle in order to obtain a desired motion effect while at the same time maintaining vehicle stability, cost efficiency and safety. WO2019072379 A1 discloses one such example where wheel brakes are used selectively to assist a turning operation by a heavy duty vehicle.

A commonly applied approach to controlling the various MSDs is to use torque control at the actuator level, where a central vehicle control unit requests torque levels from local MSD control units which in turn control the different actuators. US20150175009 A1, for instance, provides a method for controlling a vehicle during launch which is based on torque control. However, such torque control may be too slow to react to, e.g., abrupt changes in road friction levels due to, e.g., insufficient control bandwidth and to transmission delays between a central motion controller and local MSD controllers.

There is a need for improved vehicle control methods for heavy duty vehicles to improve both startability and higher speed driving.

SUMMARY

It is an object of the present disclosure to provide control units and methods which facilitate vehicle control in terms of startability and also during higher speed operation. This object is at least in part obtained by a control unit for controlling a heavy duty vehicle. The control unit is arranged to obtain an acceleration profile $a_{req}$ and a curvature profile $c_{req}$ indicative of a desired maneuver by the vehicle 100. The control unit comprises a force generation module configured to determine a set of global vehicle forces and moments required to execute the desired maneuver. The control unit further comprises a motion support device coordination module arranged to coordinate one or more MSDs to collectively provide the set of global vehicle forces and moments by generating one or more respective wheel forces, and also an inverse tyre model block configured to map the one or more wheel forces into equivalent wheel slips corresponding to the desired wheel forces. The control unit is arranged to request the wheel slips from the MSDs to control the heavy duty vehicle during the desired maneuver.

Thus, instead of requesting torques from the different actuators as is customary, wheel slip requests are sent to the wheel torque actuators at wheel end, which are then tasked with maintaining operation at the requested wheel slip. This way the control of the MSDs is moved closer to wheel end, where a higher bandwidth control is possible due to the reduced control loop latencies and faster processing which is often available closer to wheel end. The MSDs are thereby able to react much more quickly to changes in, e.g., road friction, and thus provide a more stable wheel force despite variable operating conditions. This approach to MSD control improves both startability of heavy duty vehicles, and also maneuvering in higher speed driving scenarios. For instance, if a wheel temporarily leaves the ground or experiences significantly reduced normal load due to a bump in the road, the wheel will not spin out of control. Rather, the MSD control will quickly reduce applied torque to maintain wheel slip at the requested value, such that when the wheel again touches ground, the proper wheel speed will be maintained.

The force generation module, the MSD coordination module, and the inverse tyre model block can be implemented on a single processing unit in the vehicle or distributed over two or more processing units, possibly arranged in different vehicle units or even remotely from the vehicle. Thus providing a high degree of implementation flexibility.

According to aspects, the control unit is arranged to request wheel slip as a wheel speed offset from a vehicle speed over ground if the vehicle speed over ground is below a first threshold.

A relative wheel slip measure comparing wheel speed to speed over ground, normalized by the speed over ground, may be challenging to determine at low vehicle speeds. This is because, at lower speeds and in particular at vehicle stand-still, it may be difficult to track smaller slip requests (a 5% positive wheel slip request at 1 kmph vehicle speed is only 1.05 kmph at the wheel). By sending a slip request based on a speed offset at lower speeds to the MSDs this problem is alleviated. For instance, a desired wheel speed to be maintained at low vehicle speeds by an MSD can be determined as $$\omega_w = \frac{v_x}{R} + (\omega_{off} * A_{ped})$$

where $v_x$ is the vehicle speed over ground, R is a wheel radius, $\omega_{off}$ is the wheel speed offset and $A_{ped}$ is an accelerator pedal position value between 0 and 1.

Thus, by using the accelerator pedal position mapped to a speed request for the motor determined based on a configurable wheel speed offset, improved vehicle control is obtained at lower vehicle speeds. Driver feel can be tuned by configuring tuning parameters such as $\omega_{off}$ which will be discussed in the following. The control can be gradually transferred to a pure wheel slip based request if the control unit is also arranged to request wheel slip as a normalized difference between the wheel speed and vehicle speed over ground if the vehicle speed over ground is above a second threshold. The second threshold may either be set equal to the first threshold, in which case control goes from a speed offset based control to a speed difference based control abruptly. However, additional benefits may be obtained of the second threshold is offset from the first threshold by a pre-determined speed value. In this case the control unit is optionally arranged to request a wheel behavior representing an interpolation between a wheel speed corresponding to a speed offset and a wheel speed corresponding to a wheel speed difference with respect to speed over ground if the vehicle speed is between the first and second thresholds.

According to aspects, a desired wheel speed to be maintained by an MSD at least at higher vehicle speeds, e.g., above the second threshold, is determined as $$\omega_w = \frac{\lambda_{req} v_x + v_x}{R}$$

where $v_x$ is the vehicle speed over ground, R is a wheel radius, and $\lambda_{req}$ is the requested wheel slip.

This expression amounts to a wheel slip based control where wheel slip is determined as a normalized difference between wheel speed and vehicle speed over ground. It is conveniently implemented for control close to wheel end based on, e.g., a wheel speed sensor and on regular transmissions comprising vehicle speed over ground from a central control unit.

According to aspects, the control unit is arranged to receive data indicating a capability of one or more MSDs, and to verify that the requested wheel slips are within capability of the respective MSDs. The capability reporting allows for a more robust vehicle control where requests from the MSDs are kept within feasible limits. The capability information can be used by the force generation module to ensure that global forces are kept within feasible limits, and also by the motion support device coordination module to ensure that only feasible requests for wheel slip are sent to the MSD control units.

According to aspects, the control unit is also arranged to perform brake blending by requesting a constant negative torque from a service brake MSD and to request the wheel slips from one or more electric machine MSDs. Thus, the proposed techniques can be advantageously combined with brake blending, thereby providing a robust and efficient mechanism for vehicle control comprising brake blending. Of particular advantage are implementations involving one or more MSDs comprising electric machines arranged to generate both positive and negative torque. The electrical machines can then be used to accurately control wheel slip using high control bandwidth, while other systems can be used to apply a fixed torque braking. For instance, the control unit is optionally arranged to configure the constant negative torque from the service brake MSD at a level determined based on a margin with respect to the total torque request. The slip control can therefore be accurately performed at high control bandwidth without risk of constraints inadvertently imposed from the fixed torque braking.

There is also disclosed herein computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
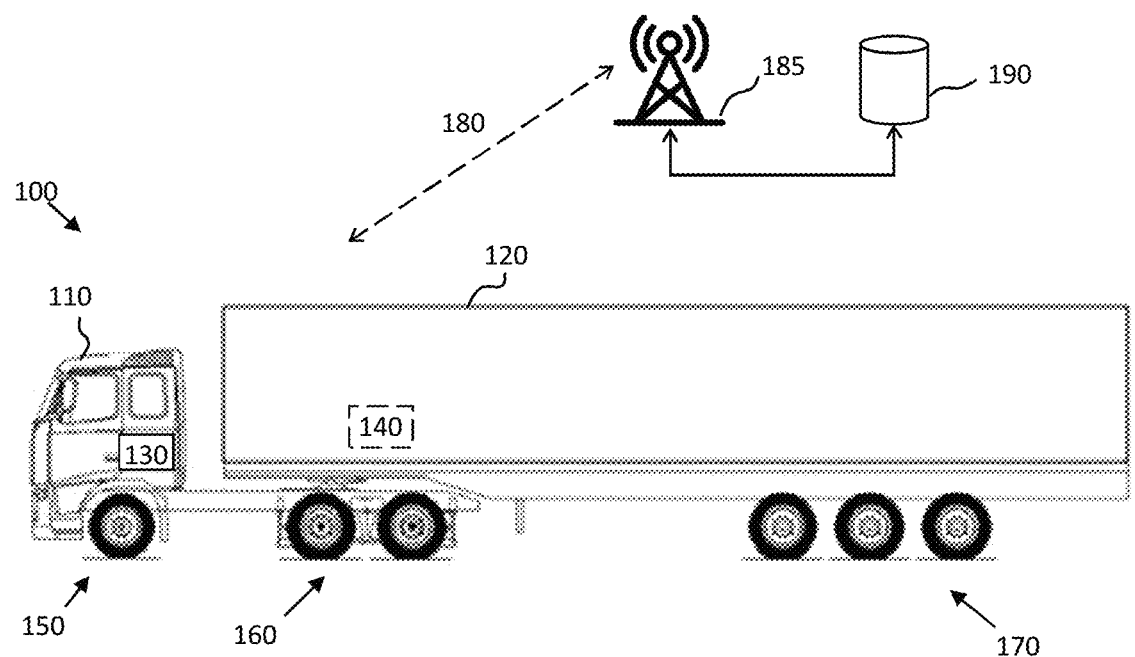
FIG. 1 shows an example heavy duty vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. Normally but not necessarily, all the wheels on the tractor 110 are braked wheels. The tractor 110 is configured to tow a first trailer unit 120 supported on trailer wheels 170 by a fifth wheel connection in a known manner. The trailer wheels are normally braked wheels but may also comprise driven wheels on one or more axles. The tractor 110 may be powered by a central combustion engine and/or by one or more electric machines. An interesting configuration where the herein disclosed techniques can be applied with advantage is in a battery powered electric vehicles comprising separate electric machines at each wheel which can provide both propulsion and braking functionality.

It is appreciated that the herein disclosed methods and control units can be applied with advantage also in other types of heavy duty vehicles, such as trucks with drawbar connections, construction equipment such as wheel loaders, buses, and the like.

The tractor 110 comprises a vehicle unit computer (VUC) 130 for controlling various kinds of functionality, i.a. to achieve propulsion, braking, and steering. Some trailer units 120 also comprise a VUC 140 for controlling various functions of the trailer, such as braking of trailer wheels, and sometimes also trailer wheel propulsion. The VUCs 130, 140 may be centralized or distributed over the vehicle on several processing circuits. Parts of the vehicle control functions may also be executed remotely, e.g., on a remote server 190 connected to the vehicle 100 via wireless link 180 and a wireless access network 185. The remote server 190 may be used to, e.g., remotely configure vehicle functions and update parameters and models used in various vehicle control functions.

The VUC 130 on the tractor 110 (and possibly also the VUC 140 on the trailer 120) may be configured to execute vehicle control methods which are organized according to a layered functional architecture where some functionality may be comprised in a traffic situation management (TSM) domain in a higher layer and some other functionality may be comprised in a vehicle motion management (VMM) domain residing in a lower functional layer. An example of this layered functional architecture 300 will be discussed in more detail in connection to FIG. 3 below, where it is appreciated that the different functions can be implemented on one or more processing units.

Figure 2:
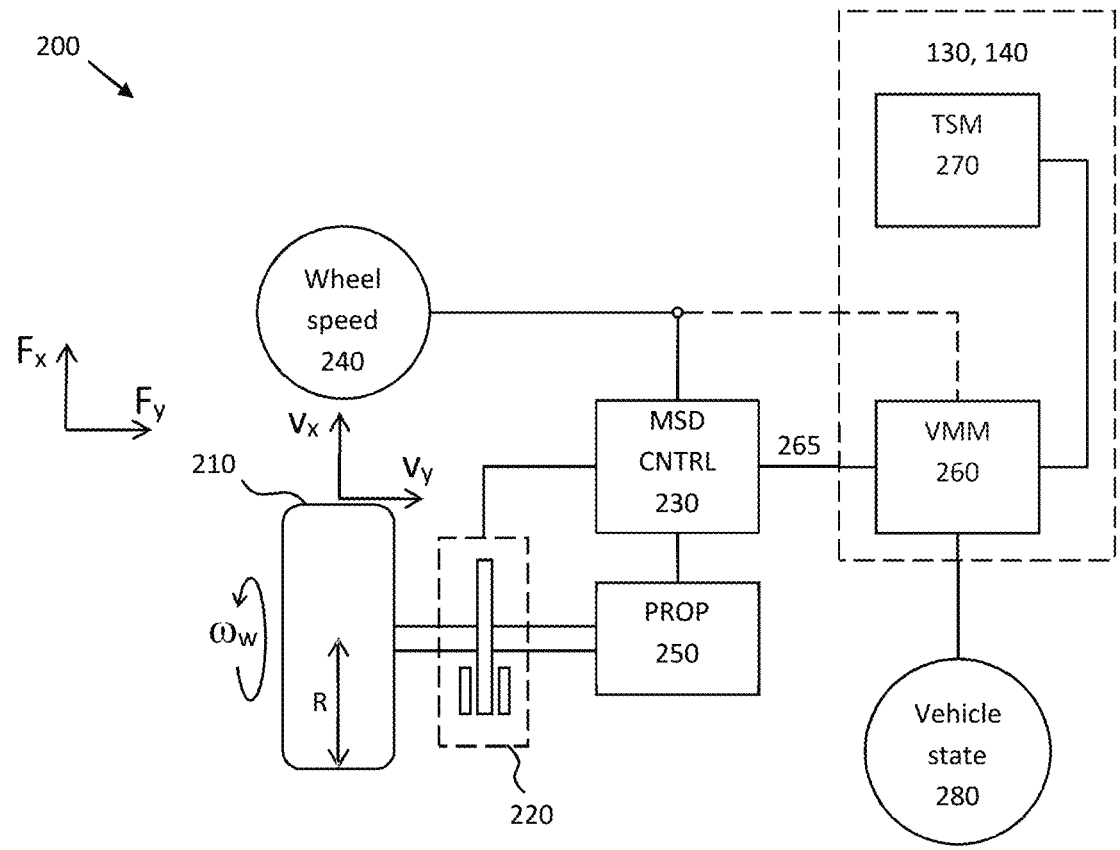
FIG. 2 schematically illustrates a motion support device control arrangement.

FIG. 2 schematically illustrates functionality 200 for controlling the motion of a wheel 210 by a friction brake 220 such as a disc brake or a drum brake, and a propulsion device 250, which represent example MSDs that may also be referred to as actuators. The friction brake 220 and the propulsion device 250 are wheel torque generating devices, which can be controlled by one or more MSD control units 230 based on, e.g., measurement data obtained from a wheel speed sensor 240 and from other vehicle state sensors 280, such as radar sensors, lidar sensors, and vision based sensors such as camera sensors and infra-red detectors. Other example torque generating MSDs which may be controlled according to the principles discussed herein comprise vehicle combustion engines, combustion engine retarder arrangements and power steering devices.

The TSM function 270 plans driving operation with a time horizon of, e.g., 10 seconds. This time frame corresponds to, e.g., the time it takes for the vehicle 100 to negotiate a curve or the like. The vehicle maneuvers planned and executed by the TSM function can be associated with acceleration profiles $a_{req}$ and curvature profiles $c_{req}$ which describe a desired vehicle velocity behavior along a path for a given maneuver. The TSM continuously requests the desired acceleration profiles and curvature profiles from the VMM function 260 which performs force allocation and MSD coordination to meet the requests from the TSM function 270 in a safe and robust manner.

The VMM function operates with a time horizon of about 1 second or so, and continuously transforms the acceleration profiles and curvature profiles into control commands for controlling vehicle motion functions, actuated by the different MSDs 220, 250 of the vehicle 100. If the vehicle is in motion, the VMM performs motion estimation, i.e., determines positions, speeds, accelerations and articulation angles of the different units in the vehicle combination by monitoring operations using various sensors 240, 280 arranged on the vehicle 100, often in connection to the MSDs. For instance, by determining vehicle unit motion using, e.g., global positioning systems, radar sensors and/or lidar sensors, and translating this vehicle unit motion into a local coordinate system of a given wheel 210 (in terms of, e.g., longitudinal and lateral velocity components), it becomes possible to accurately estimate wheel slip by comparing the vehicle (or wheel) motion over ground in the wheel reference coordinate system to data obtained from the wheel speed sensor 240 arranged in connection to the wheel 210.

A tyre model, which will be discussed in more detail in connection to FIG. 3 below, can be used to translate between desired longitudinal tyre force Fx and wheel slip $\lambda$. Wheel slip $\lambda$ relates to a difference between wheel rotational velocity and wheel speed over ground. Wheel speed $\omega_w$ is a rotational speed of the wheel, given in units of, e.g., rotations per minute or angular velocity. It can be converted into a velocity via the wheel radius R (by multiplying rotational velocity and wheel radius). Herein, a tyre model is a model of wheel behavior which describes wheel force generated in longitudinal direction (in the rolling direction) and/or lateral direction (orthogonal to the longitudinal direction) as function of wheel slip. In "Tyre and vehicle dynamics", Elsevier Ltd. 2012, ISBN 978-0-08-097016-5, Hans Pacejka covers the fundamentals of tyre models. See, e.g., chapter 7 where the relationship between wheel slip and longitudinal force is discussed.

The acceleration profiles and curvature profiles may be obtained from a driver of the heavy duty vehicle via normal control input devices such as a steering wheel, accelerator pedal and brake pedal. The acceleration profiles and curvature profiles may also be obtained from a higher layer autonomous or semi-autonomous driving function.

Figure 3:
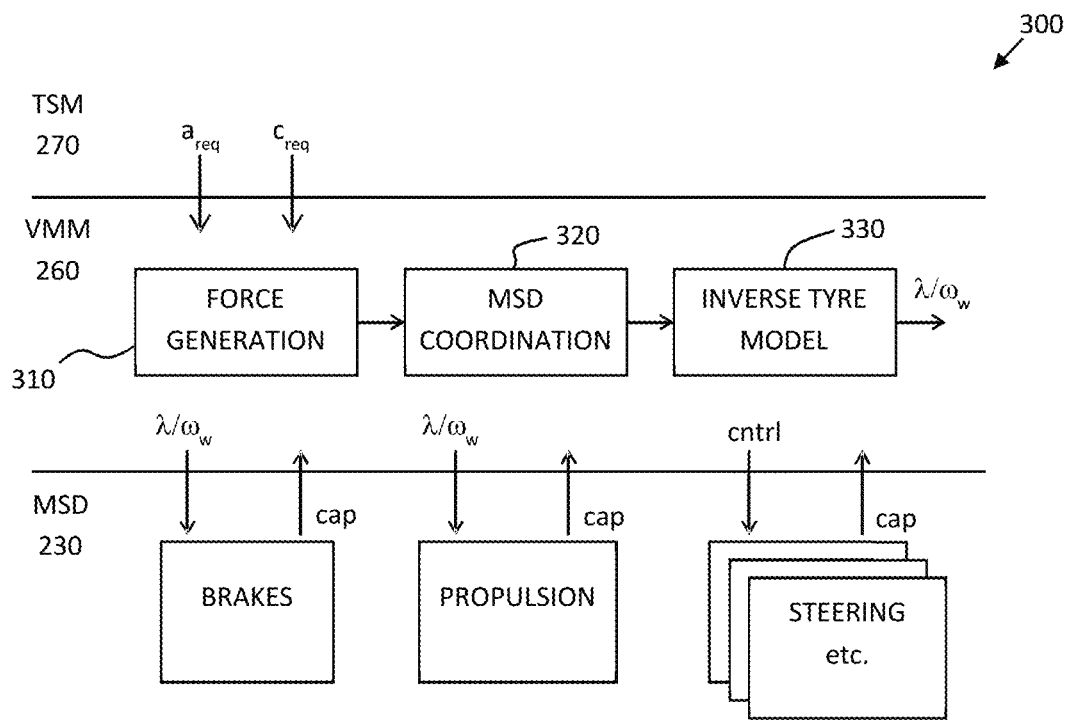
FIG. 3 schematically illustrates a layered functional control architecture.

With reference to FIG. 3, the VMM function 260 first performs global force generation in a force generation module 310. In this module the VMM function determines the required global forces and moments which will cause the vehicle to accelerate according to the acceleration profile and to follow the path defined by the curvature profile. Such global force generation methods are known in general and will therefore not be discussed in more detail herein.

Once the global force generation has been completed for a given acceleration and curvature profile, the VMM function 260 coordinates the different MSDs by an MSD coordination module 320 to collectively provide the required global forces and moments by the coordinated MSDs. It is appreciated that there are normally several different solutions for generating a given set of global forces and moments. For instance, braking can be performed both by the service brakes (normally friction brakes such as disc or drum brakes), and/or by an electric machine applying electromagnetic braking. Steering can also be performed by a power steering system as well as by differential braking as explained in WO2019072379 A1.

With reference again to FIG. 2, the interface 265 between VMM and MSDs capable of delivering torque to the vehicle's wheels has, traditionally, been focused on torque based requests to each MSD from the VMM function without any consideration towards wheel slip. However, this approach is associated with some performance limitations. In case a safety critical or excessive wheel slip situation arises, then a relevant safety function (traction control, anti-lock brakes, etc.) operated on a separate control unit normally steps in and requests a torque override in order to bring the slip back into control. A problem with this approach is that since the primary control of the actuator and any wheel slip control of the actuator is normally allocated to different electronic control units (ECUs), the latencies involved in the communication between them significantly limits the slip control performance. Moreover, the related actuator and slip assumptions made in the two ECUs that are used to achieve the actual slip control can be inconsistent and this in turn can lead to sub-optimal performance. Also, as mentioned above, the control bandwidth on the interface 265 may be associated with bandwidth limitation which prevents updating torque requests fast enough to control the vehicle in difficult scenarios, such as split friction driving scenarios, vehicle start in hilly conditions, and the like.

Significant benefits can be achieved by instead using a wheel speed or wheel slip based request on the interface 265 between VMM and the MSD controller or controllers 230, thereby shifting the difficult actuator speed control loop to the local MSD controllers 230, which generally operate with a much shorter sample time (higher control bandwidth) than the VMM function 260, and which do not suffer from a bandwidth limitation on the interface 265 between central VCU 130, 140 and local MSD controller. Such an architecture can provide much better disturbance rejection compared to a torque based control interface and improve the predictability of the forces generated at the tyre road contact patch.

Also, this type of local wheel slip- or wheel speed-based control will be much less sensitive to abrupt changes in road friction and/or wheel normal force. Legacy torque-controlled wheels risk excessive wheel slip which triggers countermeasures such as traction control and the like if road friction is suddenly reduced or if the vehicle drives over a bump in the road which temporarily and suddenly reduces wheel normal force. However, if the MSD control is instead targeted at maintaining wheel slip at a constant level, then the system will quickly detect the change in wheel speed and adjust torque to maintain wheel slip at the requested level. In fact, the proposed system will even maintain desired wheel speed if the wheel loses contact with ground for a short while. When the wheel leaves the ground, the increase in wheel speed will quickly be detected by the MSD controller which immediately reduces applied torque to maintain wheel speed according to the requested wheel slip.

Longitudinal wheel slip λ may, in accordance with SAE J670 (SAE Vehicle Dynamics Standards Committee Jan. 24, 2008) be defined as $$\lambda = \frac{R\omega_w - v_x}{\max(|R\omega_w|, |v_x|)}$$

where R is an effective wheel radius in meters, $\omega_w$ is the angular velocity of the wheel, and $v_x$ is the longitudinal speed of the wheel over ground (in the coordinate system of the wheel). Thus, λ is bounded between −1 and 1 and quantifies how much the wheel is slipping with respect to the road surface.

Wheel slip is, in essence, a speed difference measured between the wheel and the vehicle. It is therefore appreciated that the herein disclosed techniques can be adapted for use with any type of wheel slip definition. It is also appreciated that a wheel slip value is equivalent to a wheel speed value given a velocity of the wheel over the surface, in the coordinate system of the wheel.

The VMM 260 and optionally also the MSD control unit 230 maintains information on $v_x$ (in the reference frame of the wheel), while a wheel speed sensor 240 or the like can be used to determine $\omega_w$ (the rotational velocity of the wheel). The information on $v_x$ may, for instance, be constantly updated based on vehicle state sensors such as global positioning sensors, radar sensors, and/or lidar sensors, as well as vision-based sensors such as cameras and the like.

Figure 4:
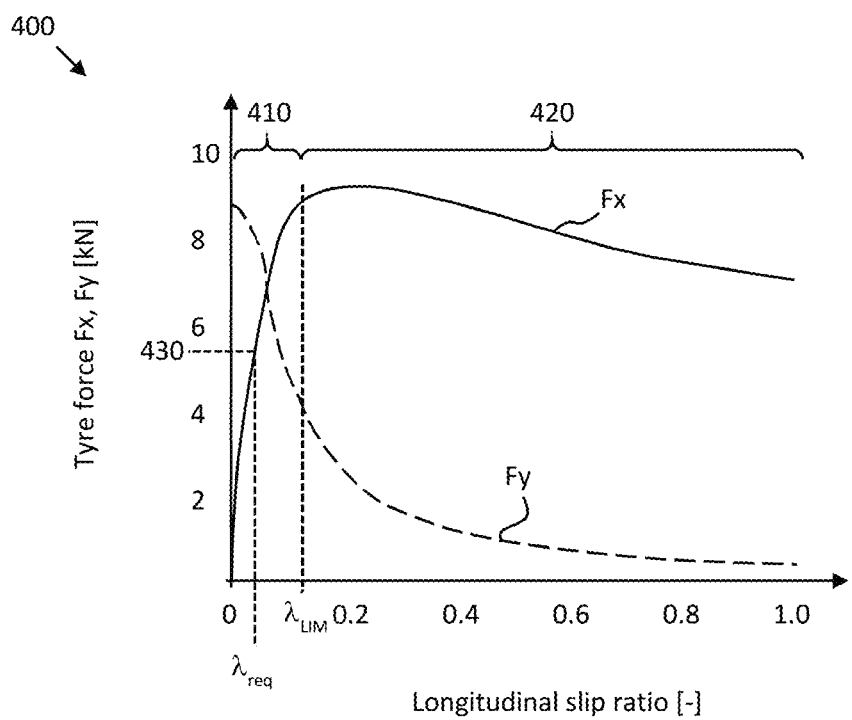
FIG. 4 is a graph showing an example of tyre force as function of wheel slip.

FIG. 4 is a graph 400 showing achievable tyre force as function of wheel slip. The longitudinal obtainable tyre force Fx shows an almost linearly increasing part 410 for small wheel slips, followed by a part 420 with more non-linear behaviour for larger wheel slips. The obtainable lateral tyre force Fy decreases rapidly even at relatively small longitudinal wheel slips. It is desirable to maintain vehicle operation in the linear region 410, where the obtainable longitudinal force in response to an applied brake command is easier to predict, and where enough lateral tyre force can be generated if needed. To ensure operation in this region, a wheel slip limit $\lambda_{LIM}$ on the order of, e.g., 0.1, can be imposed on a given wheel. For larger wheel slips, e.g., exceeding 0.1, a more non-linear region 420 is seen. Control of a vehicle in this region may be difficult and is therefore often avoided.

This type of tyre model can be used by the VMM 260 to generate a desired tyre force at some wheel. Instead of requesting a torque corresponding to the desired tyre force as in legacy systems, the VMM function 260 can translate or map the desired tyre force into an equivalent wheel slip (or, equivalently, a wheel speed relative to a speed over ground) and request this wheel slip from the MSD controller instead of requesting a torque. Thus, in FIG. 4, if the desired wheel force to be generated at some wheel is about 5.5 kN, indicated by the dotted line with reference numeral 430, then this force will be generated by the wheel if the equivalent wheel slip $\lambda_{req}$ is requested instead. As long as the MSD control unit 230 controls the wheel to maintain this wheel slip, a close to constant wheel force at the desired value will be generated.

One of the main advantages of this approach is that the MSD control unit 230 will be able to deliver a desired wheel force with much higher control bandwidth, and thereby more accurately, by maintaining operation at the desired wheel slip, using the vehicle speed $v_x$ and the wheel speed $\omega_w$. This conversion from required wheel force to wheel speed or wheel slip is performed in the inverse tyre model block 330 in FIG. 3. The control unit 300 can be arranged to store a pre-determined inverse tyre model $f^{-1}$ in memory for use in the inverse tyre model block 330. The inverse tyre model $f^1$ may also be updated regularly via the wireless link to the remote server 190, and thus kept up to date with the overall vehicle characteristics.

To summarize the above discussions, there is disclosed herein a control unit 130, 140, 300 for controlling a heavy duty vehicle 100. The control unit is arranged to obtain an acceleration profile $a_{req}$ and a curvature profile $c_{req}$ indicative of a desired maneuver by the vehicle 100. The acceleration profile $a_{req}$ and curvature profile $c_{req}$ may, e.g., be indicative of a manual input by a driver, or it can be the output of some semi-autonomous or autonomous drive higher layer function. The source of the acceleration profile and curvature profile is not within scope of the present disclosure and will therefore not be discussed in more detail herein.

The control unit 130, 140, 300 comprises a force generation module 310 configured to determine a set of global vehicle forces and moments required to execute the desired maneuver. For instance, to accelerate a vehicle combination like that illustrated in FIG. 1, positive torque needs to be generated at one or more wheels by a computable amount. If the desired maneuver comprises braking, then one option is to generate negative torque at one or more wheels, e.g., by applying service brakes or by generating negative torque by one or more electric machines. Brake blending can also be considered, as will be discussed in more detail below. The set of global vehicle forces may comprise, e.g., a force vector in longitudinal and lateral direction for each vehicle unit 110, 120, and a moment about a mass center for each vehicle unit 110, 120.

The control unit 130, 140, 300 further comprises an MSD coordination module 320 arranged to coordinate one or more MSDs to collectively provide the global vehicle forces and moments by generating one or more respective wheel forces acting on vehicle units 110, 120, at least in the longitudinal direction. Optionally, the MSD control units on the vehicle 100 provides capability signals to the control unit which informs the control unit about a range of wheel forces, or torques, that can be generated. The VMM function can use these capability reports to make sure that the requested wheel slips can feasibly be generated by the MSDs in the current operating scenario. WO2019072379 A1 discloses an example of force generation and MSD coordination where wheel brakes are used selectively to assist a turning operation by a heavy duty vehicle.

Normally, in legacy systems, the MSD coordination results in torque requests which are sent to the different MSD control units in order to generate wheel forces to perform the desired maneuver. However, differently from known vehicle control units, the control units 130, 140 300 disclosed herein also comprise an inverse tyre model block 330 configured to map the one or more wheel forces into equivalent wheel slips λ, and then request the wheel slips X from the MSDs instead of (or in addition to) requesting torques. With reference to FIG. 2, this means that the MSD control unit 230 is requested to control wheel speed to maintain a desired wheel slip or wheel speed relative to vehicle speed instead of a desired wheel torque. As noted above, the main advantage of this approach is that the MSD control unit 230 will be able to deliver a desired wheel force with much accuracy, especially during transients in driving conditions, by maintaining operation at the desired wheel slip, using the vehicle speed $v_x$ and the wheel rotational velocity $\omega_w$ compared to when the MSD control unit is tasked with maintaining a target wheel torque. It is appreciated that it is equivalent to request a wheel speed in dependence of the wheel speed over ground, since the wheel slip is simply a difference between wheel rotational velocity and wheel speed over ground.

In this way, a torque generating MSD actuator can be arranged to generate a wheel speed associated with a constant wheel slip, i.e., at a constant difference compared to wheel speed over ground. Towards this end, the slip equation discussed above can be rearranged and used as basis to give the required target wheel speed to be maintained for a given slip $$\omega_w = \frac{\lambda_{req}\max(|R\omega_w|, |v_x|) + v_x}{R}$$

where $\omega_w$ is the target wheel speed to be maintained and $\lambda_{req}$ is the slip request based on, e.g., an accelerator pedal mapping. It is appreciated that, in order to provide $\omega_w$ as an input to an electric machine, it may be necessary to first convert it into a motor speed according to the implemented gear ratio and final drive ratio. The expression above may be somewhat simplified if normalization is always with respect to vehicle speed $v_x$, $$\omega_w = \frac{\lambda_{req}v_x + v_x}{R}$$

Figure 5:
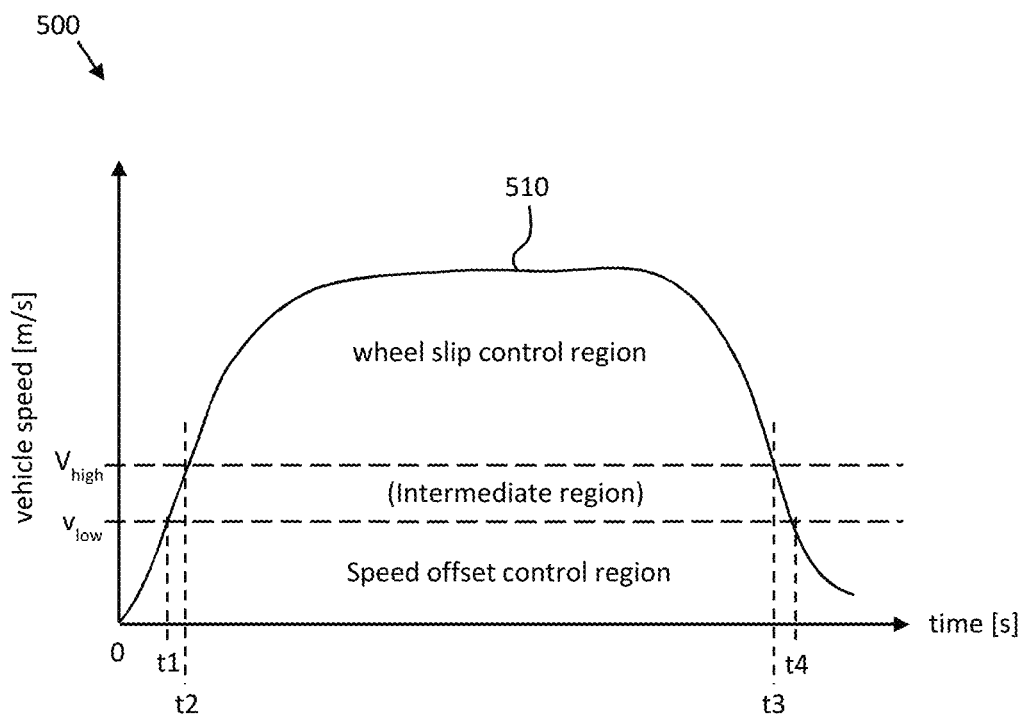
FIG. 5 is a graph showing vehicle speed and various associated control regions.

At lower speeds and in particular at zero speed (standstill), it may be difficult to track smaller slip requests. For instance, a 5% positive wheel slip request at 1 kmph vehicle speed only amounts to about 1.05 kmph at the wheel. These problems can be solved by sending speed requests based on a speed offset at lower speeds (which equates to a larger slip request) which optionally gradually changes to the required slip request at higher speeds. This results in a wheel speed control by the MSD control unit according to $$\omega_w = \begin{cases} \frac{v_x}{R} + (\omega_{off} * A_{ped}) & \text{if } v_x < v_{low} \\ \frac{\lambda_{req}v_x + v_x}{R} & \text{if } v_x > v_{high} \\ \text{optional intermediate control region} & \text{if } v_{low} \le v_x \le v_{high} \end{cases}$$

where $v_x$ is the vehicle speed (i.e. wheel speed over ground), R is a wheel radius, $\omega_{off}$ is the wheel speed offset and $A_{ped}$ is an accelerator pedal position which is here defined as a unitless value, e.g., from 0 to 1. The offset $\omega_{off}$ may be determined as $$\omega_{off} = \min(k_{PedalFeel} * A_{ped}, k_{offsetLim})$$

where, $k_{PedalFeel}$ is a tuning parameter which can be determined based on a certain desired driver feel or other input sensitivity metric, and where $k_{OffsetLim}$ is a low speed offset limit. These parameters can be changed for different vehicles or to have different settings on the same vehicle. These tuning parameters can be pre-configured or manually configurable depending, e.g., on driver preference. Thus, optionally, the control unit is arranged to request wheel slip X as a wheel speed offset $\omega_{off}$ from a vehicle speed $v_x$ if the vehicle speed $v_x$ is below a first threshold $v_{low}$. Optionally, the control unit is also arranged to request wheel slip λ as a normalized difference between wheel speed $\omega_w$ and vehicle or wheel speed $v_x$ over ground if the wheel speed $v_x$ over ground is above a second threshold $v_{high}$. The second threshold $v_{high}$ may be equal to the first threshold $v_{low}$, whereby no intermediate control region exists. Alternatively, With reference to FIG. 5, an intermediate control region may be present, in which case the second threshold $v_{high}$ is offset from the first threshold $v_{low}$ by a pre-determined velocity amount, and where the control unit is arranged to request a wheel behavior representing an interpolation between a wheel speed $\omega_w$ corresponding to a speed offset and a wheel speed $\omega_w$ corresponding to a wheel slip λ if the vehicle speed is between the first and second thresholds. The interpolation may, e.g., be implemented as a look-up table, or as a weighting between the two wheel speeds where the weight is configured in dependence of the vehicle speed in relation to the thresholds. This means that the one or more MSD control units in a vehicle starting from standstill will, as exemplified in the graph 500 in FIG. 5, first apply a control based on a wheel speed offset until the vehicle reaches a speed equal to the first threshold $v_{low}$, which happens at time $t_1$. The wheel speed is then controlled by the MSD control unit 230 in the intermediate region as an interpolation between the wheel speed value given by the speed offset control approach and the wheel speed given by the relative wheel slip control approach. Once the vehicle speed goes above the second threshold $v_{high}$, the vehicle control shifts to a pure relative wheel slip based control, where wheel forces are mapped onto equivalent wheel slips via the inverse tyre model, and where the MSD control units control wheel speed to maintain operation at the requested relative wheel slip, thereby obtaining the above mentioned advantages and avoiding the disadvantages associated with the legacy torque-based control interface towards the MSD control units.

According to some aspects, the control unit is arranged to receive data indicating a capability of one or more MSDs, and to verify that the requested wheel slips are within capability of the respective MSDs. This capability data may be in the form of torque ranges or the like, which can be compared to currently desired wheel forces. In case the desired wheel forces are outside of what can be provided in the torque capability range, a different MSD coordination solution may be necessary, or even a different global force generation solution.

Figure 6:
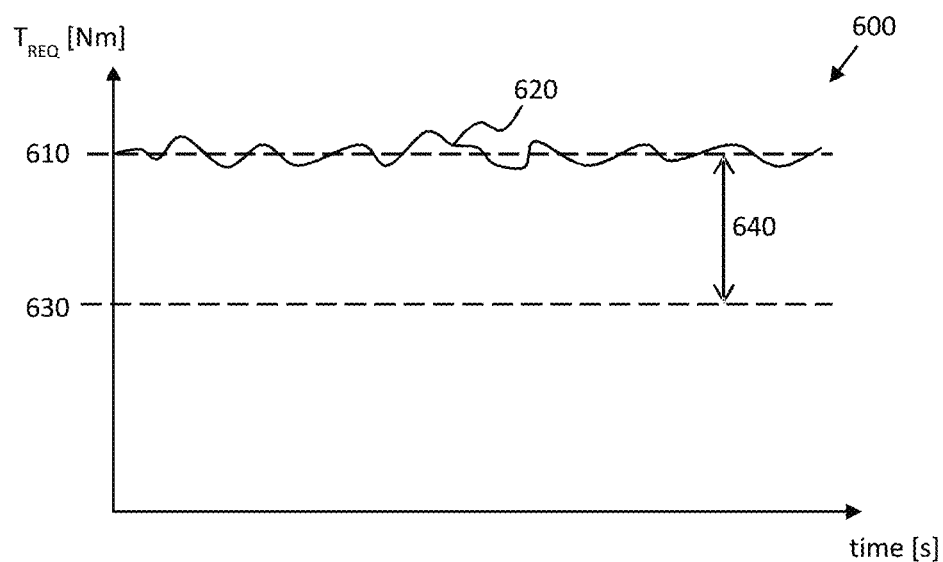
FIG. 6 is a graph illustrating an example vehicle operation during brake blending.

FIG. 6 shows an example 600 of average total torque request 610 by two example MSDs involved in brake blending, i.e., when two or more MSDs are used jointly to generate a braking wheel force. In the example of FIG. 6, an electric machine is used to provide a slip-controlled braking wheel torque 620 around the average total torque request 610. The applied torque by the electric machine is controlled with high bandwidth since the control is based on wheel slip and control is local to wheel end or wheel axle. A baseline braking torque 630 is applied by the service brake system, i.e., vehicle friction brakes, or by an auxiliary brake system like an engine retarder or the like. The baseline torque level 630 is such that the control unit has enough time to disengage the service brakes and/or auxiliary brakes in case the applied torque 620 by the electric machine should go close to zero, in which case the high bandwidth torque control will be lost. Towards this end, the control unit may be arranged to configure the constant torque 630 of the service brake or auxiliary brake at a torque level which is below the total torque request 610 by a margin 640 thereby allowing a torque range in which the electric machine can operate. This margin 640 is preferably configured in dependence of a time to disengage the service brake or auxiliary brake from an active braking state. In other words, the system leaves enough room for the electric machine to perform the slip-based wheel control even if road conditions should abruptly change, requiring a reconfiguration of the constant torque 630.

The margin may, e.g., be determined by a safety factor multiplied with the total requested torque, such that the constant torque applied by the service brake or auxiliary brake is always a given percentage below the total requested torque. This gives the electric machine enough room to actuate braking.

According to some aspects, the control unit is arranged to configure the margin 640 to optimize energy regeneration by the electric machine. In this case the electric machine is operated at close to maximum negative torque in order to provide as much regenerated energy as possible, e.g., when driving downhill. Still, if the electric machine torque generating capability should go down, for instance due to overheating or the like, then the margin 640 will be reduced accordingly.

Consequently, the brake system on the vehicle 100 may comprise a service brake system and an electrical machine brake system. The methods disclosed herein optionally comprises determining a total braking wheel force for a wheel of the vehicle, obtaining a brake torque capability of the electrical machine, determining if the total braking wheel force request exceeds the brake torque capability of the electrical machine, and if the total wheel force request exceeds the brake torque capability of the electrical machine, applying a baseline brake torque by the service brake system. The baseline brake torque is configured to compensate for a difference between the total wheel force request and the brake torque capability of the electrical machine. The method also comprises controlling wheel slip by the electrical machine brake system and not by the service brake system which is instead controlled at constant torque level. This way slip control is efficiently handled mainly by the electrical machine during a majority of braking operations, even during relatively hard braking events. The brake torque capability of the electrical machine is monitored, and a torque controlled (fixed torque level) braking by the service brake system is used to ensure that the brake torque requests can be met. This means that the electrical machine controls wheel slip, while the service brake system slip controller is not active, as long as the brake torque requests are not above a threshold level where the service brakes are used to provide, e.g., hard emergency braking. This simplifies control and allows for an efficient operation by, e.g., a regenerative deceleration system, since the service brake slip control system does not need to be taken into account in terms of, e.g., coordination and joint wheel slip control.

Thus, according to some aspects, the control unit is arranged to perform brake blending by requesting a constant negative torque from a service brake MSD and to request the wheel slips λ from one or more electric machine MSDs. In other words, the techniques disclosed herein can be combined with torque control of a service brake systems to let the service brakes fill up the extra capability while maximizing electric motor usage and having it do most of the high frequency control which is better for wheel speed control and efficiency in terms of regeneration.

Similarly, there are also possibilities to map brake pedal to negative speed request from the motor and blend it with existing service brakes.

According to some aspects the electrical machine is able to provide a higher torque, a peak torque, for a limited amount of time. Thus, according to some aspects, there is a time dependence associated with the brake torque capability of the electrical machine, and the total brake torque request comprises a time duration.

Figure 7:
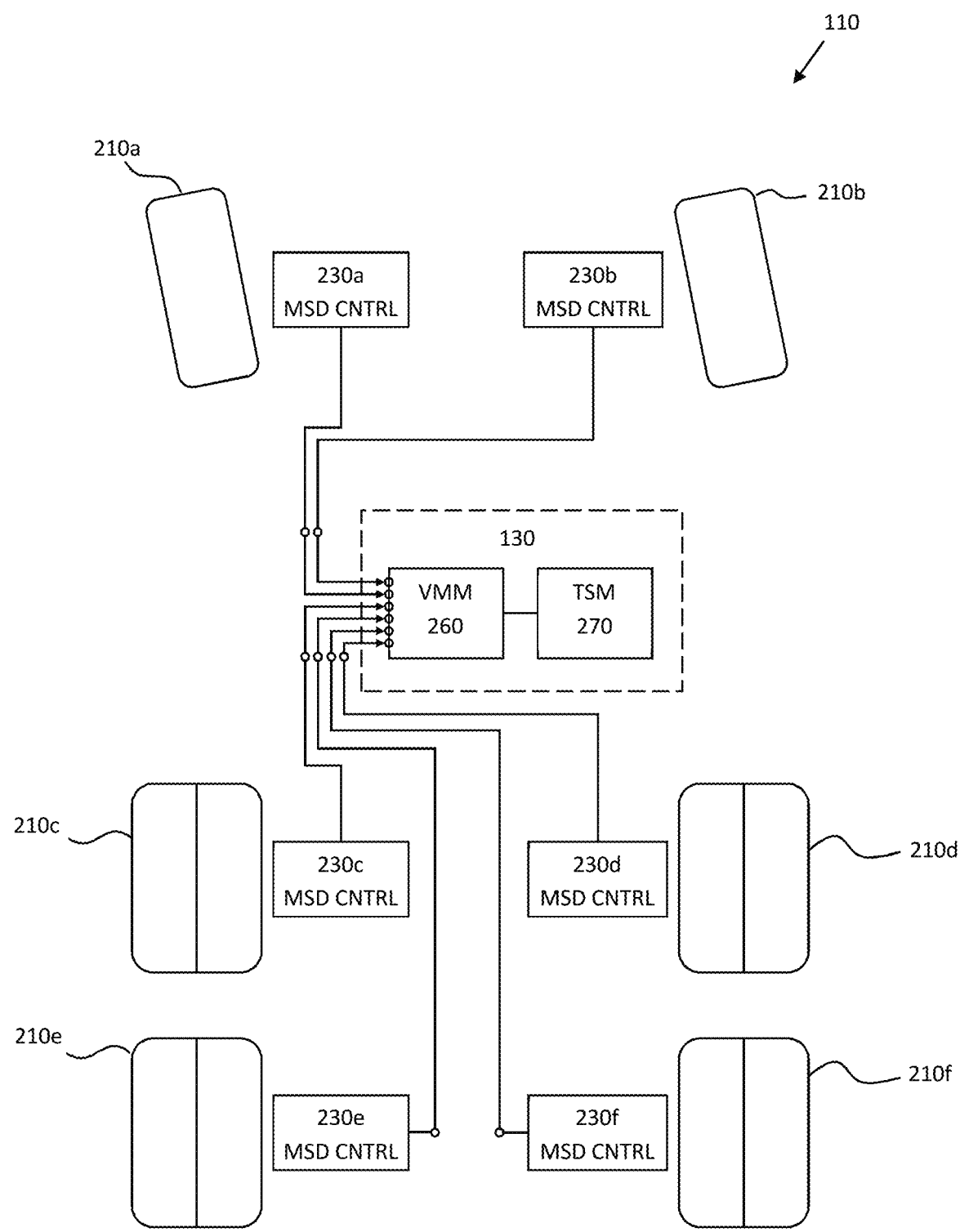
FIG. 7 shows an example motion support device control system.

FIG. 7 illustrates a vehicle control system comprising a plurality of MSD control units 230a-230f arranged to control respective wheels 210a-210f. The MSD control units are arranged to be controlled by a VUC 130 comprising the VMM function 260 and the TSM function 270 discussed above.

Figure 8:
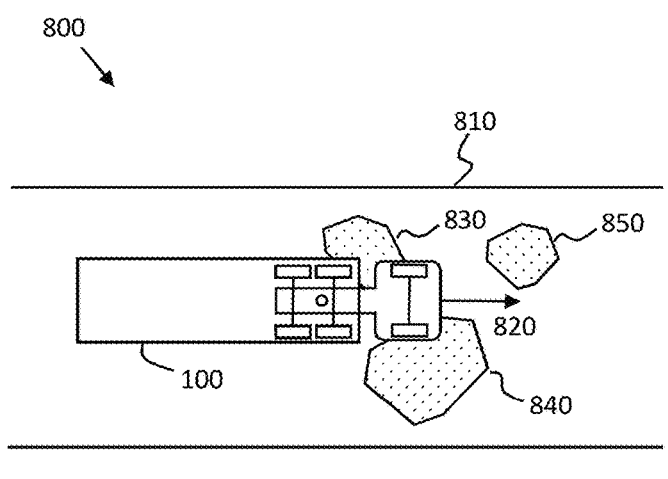
FIG. 8 schematically illustrates a split friction operating condition.

FIG. 8 schematically illustrates driving in a split friction scenario 800, where areas of low friction 830, 840, 850 are encountered without prior warning. The vehicle 100 is able to safely and efficiently follow an acceleration profile in a forward direction 820. Operation in this type of scenario with a legacy torque-based MSD control architecture is challenging due to, e.g., control bandwidth limitation. However, if a wheel slip is instead requested from the MSD control units on the vehicle 100, then a wheel force more close to the desired wheel force will be generated. Also, if some wheel temporarily experiences an abrupt change in normal force, such as if the vehicle drives over a bump in the road 810, then no excessive wheel slip will result, since the wheel speed sensor will quickly detect the increase in wheel speed and compensate accordingly to maintain operation at the requested wheel slip.

Figure 9:
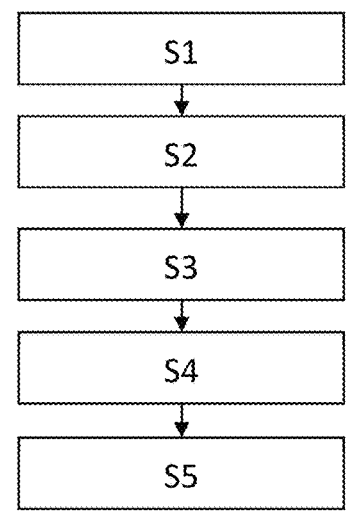
FIG. 9 is a flow chart illustrating a method.

FIG. 9 is a flow chart illustrating methods which summarize at least some of the discussions above. There is illustrated a method performed in a control unit 130, 140, 300 for controlling a heavy duty vehicle 100. The method comprises:

obtaining S1 an acceleration profile $a_{req}$ and a curvature profile $c_{req}$ indicative of a desired maneuver by the vehicle 100, determining S2, by a force generation module 310, a set of global vehicle forces and moments required to execute the desired maneuver, coordinating S3, by a motion support device, MSD, coordination module 320, one or more MSDs to collectively provide the global vehicle forces and moments by generating one or more respective wheel forces, and mapping S4, by an inverse tyre model 330, the one or more wheel forces into equivalent wheel slips $\lambda$, wherein the method further comprises controlling S5 the heavy duty vehicle by requesting the wheel slips $\lambda$ from the MSDs. Various aspects of the method was discussed above in connection to FIGS. 1-8.

Figure 10:
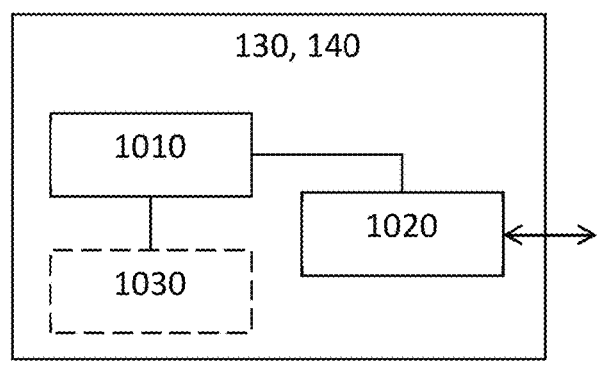
FIG. 10 schematically illustrates a control unit.

FIG. 10 schematically illustrates, in terms of a number of functional units, the components of a control unit such as the VUC 130, 140, 300. The control unit may implement one or more of the above discussed functions of the TSM 270, VMM 260 and/or the MSD control function 230, according to embodiments of the discussions herein. The control unit is configured to execute at least some of the functions discussed above for control of a heavy duty vehicle 100. Processing circuitry 1010 is provided using any combination of one or more of a suitable central processing unit CPU, multiprocessor, microcontroller, digital signal processor DSP, etc., capable of executing software instructions stored in a computer program product, e.g. in the form of a storage medium 1020. The processing circuitry 1010 may further be provided as at least one application specific integrated circuit ASIC, or field programmable gate array FPGA.

Particularly, the processing circuitry 1010 is configured to cause the control unit 101 to perform a set of operations, or steps, such as the methods discussed in connection to FIG. 7. For example, the storage medium 1020 may store the set of operations, and the processing circuitry 1010 may be configured to retrieve the set of operations from the storage medium 1020 to cause the control unit 800 to perform the set of operations. The set of operations may be provided as a set of executable instructions. Thus, the processing circuitry 1010 is thereby arranged to execute methods as herein disclosed.

The storage medium 1020 may also comprise persistent storage, which, for example, can be any single one or combination of magnetic memory, optical memory, solid state memory or even remotely mounted memory.

The control unit 800 may further comprise an interface 1030 for communications with at least one external device. As such the interface 1030 may comprise one or more transmitters and receivers, comprising analogue and digital components and a suitable number of ports for wireline or wireless communication.

The processing circuitry 1010 controls the general operation of the control unit 800, e.g., by sending data and control signals to the interface 1030 and the storage medium 1020, by receiving data and reports from the interface 1030, and by retrieving data and instructions from the storage medium 1020. Other components, as well as the related functionality, of the control node are omitted in order not to obscure the concepts presented herein.

Figure 11:
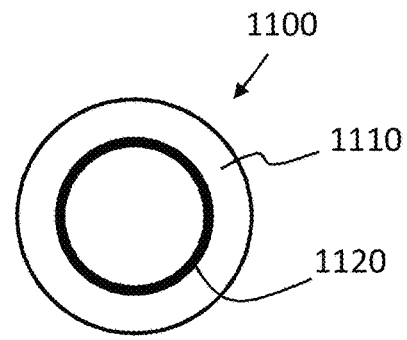
FIG. 11 shows an example computer program product.

FIG. 11 illustrates a computer readable medium 1110 carrying a computer program comprising program code means 1120 for performing the methods illustrated in FIG. 9, when said program product is run on a computer. The computer readable medium and the code means may together form a computer program product 1100.

The invention claimed is:

1. A control unit for controlling a heavy duty vehicle, wherein the control unit is arranged to obtain an acceleration profile and a curvature profile indicative of a desired maneuver by the heavy duty vehicle from one or more control devices of the heavy duty vehicle, the control unit comprising:

a force generation module configured to continuously determine at predetermined time intervals a set of global heavy duty vehicle forces and moments required to execute the desired maneuver based on the acceleration profile and the curvature profile;

a motion support device, (MSD), coordination module arranged to coordinate a plurality of MSDs to collectively provide the set of global heavy duty vehicle forces and moments by generating one or more respective wheel forces of each of a plurality of wheels of the heavy duty vehicle; and an inverse tire model block configured to continuously map, at the predetermined time intervals, the one or more respective wheel forces of each of the plurality of wheels into equivalent wheel slips of each of the plurality of wheels, the equivalent wheel slips are proportional to a speed difference between a speed of each of the plurality of wheels and a speed of the vehicle relative to ground, wherein the control unit is configured and arranged to use a wheel slip request on an interface towards the MSDs to maintain the wheel slips so as to maintain the speed of each of the plurality of wheels relative to speed of the vehicle relative to the ground to control the heavy duty vehicle during the desired maneuver.

2. The control unit according to claim 1, wherein the control unit is arranged to request wheel slip as a wheel speed offset from a vehicle speed over ground if the vehicle speed over ground is below a first threshold.

3. The control unit according to claim 2, wherein a desired wheel speed $\omega_w$ to be maintained by the MSD is determined as $$\omega_w = \frac{v_x}{R} + (\omega_{off} * A_{ped})$$

where $v_x$ is a vehicle speed over ground, R is a wheel radius, $\omega_{off}$ is the wheel speed offset, and $A_{ped}$ is an accelerator pedal position value between 0 and 1.

4. The control unit according to claim 3, where the wheel speed offset $\omega_{off}$ is determined in dependence of a gain factor $k_{PedalFeel}$ associated with a driver preference and/or a low speed offset limit $k_{OffsetLim}$.

5. The control unit according to claim 2, wherein the control unit is arranged to request wheel slip as a normalized difference between the wheel speed $\omega_w$ and vehicle speed over ground if the vehicle speed over ground is above a second threshold.

6. The control unit according to claim 5, wherein a desired wheel speed $\omega_w$ to be maintained by an MSD is determined as $$\omega_w = \frac{\lambda_{req} v_x + v_x}{R}$$

or $$\omega_w = \frac{\lambda_{req} \max(|R\omega_w|, |v_x|) + v_x}{R}$$

where $v_x$ is the vehicle speed over ground, R is a wheel radius, and $\lambda_{req}$ is a requested wheel slip.

7. The control unit according to claim 5, wherein the second threshold is equal to the first threshold.

8. The control unit according to claim 5, wherein the second threshold is offset from the first threshold by a pre-determined speed value, wherein the control unit is arranged to request a wheel behavior representing an interpolation between a wheel speed corresponding to a speed offset and a wheel speed corresponding to a wheel speed difference with respect to speed over ground if the vehicle speed is between the first and second thresholds.

9. The control unit according to claim 1, wherein the control unit is arranged to receive data indicating a capability of one or more MSDs, and to verify that the requested wheel slips are within capability of the respective MSDs.

10. The control unit according to claim 1, wherein the control unit is arranged to perform brake blending by requesting a constant negative torque from a service brake or auxiliary brake MSD and to request the wheel slips from one or more electric machine MSDs.

11. The control unit according to claim 10, wherein the control unit is arranged to configure the constant negative torque of the service brake or auxiliary brake at a torque level which is below a total torque request by a margin, wherein the margin is configured in dependence of an expected time to disengage the service brake or auxiliary brake from an active braking state.

12. The control unit according to claim 1, wherein the MSDs comprise at least one electric machine arranged to generate both positive and negative torque.

13. A vehicle comprising the control unit according to claim 1.

14. A non-transitory computer readable medium carrying a computer program comprising program code for performing the steps of claim 1 when said program code is run on a computer or on processing circuitry of a control unit.

15. A method performed in a control unit for controlling a heavy duty vehicle, the method comprising:
    obtaining an acceleration profile and a curvature profile indicative of a desired maneuver by the vehicle from one or more control devices of the heavy duty vehicle,
    determining, continuously at predetermined time intervals, by a force generation module, a set of global vehicle forces and moments required to execute the desired maneuver based on the acceleration profile and the curvature profile,
    coordinating, by a motion support device, MSD, coordination module, a plurality of MSDs to collectively provide the global vehicle forces and moments by generating one or more respective wheel forces of each of a plurality of wheels of the heavy duty vehicle,
    mapping, continuously at the predetermined time intervals, by an inverse tire model, the one or more wheel forces into equivalent wheel slips of each of the plurality of wheels, the equivalent wheel slips are proportional to a speed difference between a speed of each of the plurality of wheels and a speed of the vehicle relative to ground, and
    controlling the heavy duty vehicle to use a wheel slip request on an interface towards the MSDs to maintain the wheel slips so as to maintain the speed of each of the plurality of wheels relative to speed of the vehicle relative to the ground to control the heavy duty vehicle during the desired maneuver.

* * * * *